US009440388B2

United States Patent
Nagami (10) Patent No.: US 9,440,388 B2
(45) Date of Patent: Sep. 13, 2016

(54) CONTROL DEVICE FOR MOLDING MACHINE AND MANUFACTURING METHOD FOR MOLDED ARTICLE

(71) Applicant: Toshiba Kikai Kabushiki Kaisha, Tokyo (JP)

(72) Inventor: Takeshi Nagami, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 818 days.

(21) Appl. No.: 13/760,754

(22) Filed: Feb. 6, 2013

(65) Prior Publication Data

US 2013/0277885 A1 Oct. 24, 2013

Related U.S. Application Data

(63) Continuation of application No. PCT/JP2011/067514, filed on Jul. 29, 2011.

(30) Foreign Application Priority Data

Aug. 6, 2010 (JP) ................................. 2010-177850

(51) Int. Cl.
*B29C 45/76* (2006.01)
*B22D 17/32* (2006.01)

(52) U.S. Cl.
CPC ............. *B29C 45/762* (2013.01); *B22D 17/32* (2013.01); *B29C 45/76* (2013.01); *B29C 2045/7606* (2013.01)

(58) Field of Classification Search
CPC ................ B29C 45/762; B29C 45/76; B29C 2045/7606; B22D 17/32
See application file for complete search history.

(56) References Cited

U.S. PATENT DOCUMENTS 5,195,029 A * 3/1993 Murai .................. B29C 45/766
264/40.7
5,470,218 A * 11/1995 Hillman ............... B29C 45/768
264/40.6
(Continued)

FOREIGN PATENT DOCUMENTS

CN 1654185 8/2005
DE 102006017499 10/2006
(Continued)

OTHER PUBLICATIONS

International Search Report issued in PCT/JP2011/067514 on Aug. 23, 2011.
(Continued)

*Primary Examiner* — Ramesh Patel
(74) *Attorney, Agent, or Firm* — DLA Piper LLP US (57) ABSTRACT

A molding machine is provided with a display section with a touchpanel. A first storage section of a storage device is stored with molding conditions corresponding to molded articles each affixed with identification information. A second storage section is stored with image data on the molded articles each affixed with identification information. A third storage section is stored with memo information corresponding to the molded articles each affixed with identification information. When an image selection switch section on the display section is operated, the screen is changed to an image list screen and a plurality of images called up from the second storage section are listed. If one of these images is touched, the screen is changed to a detail display screen.

12 Claims, 8 Drawing Sheets

(56) References Cited

U.S. PATENT DOCUMENTS

| | | | | |
|---|---|---|---|---|
| 6,512,528 | B1* | 1/2003 | Yamamoto | G05B 19/409 700/200 |
| 7,218,990 | B2* | 5/2007 | Katsuta | B29C 45/74 700/202 |
| 7,421,309 | B2* | 9/2008 | Nishizawa | B29C 45/76 264/40.1 |
| 7,580,771 | B2* | 8/2009 | Quail | B22D 17/007 700/197 |
| 7,604,471 | B2* | 10/2009 | Saito | B29C 45/766 425/144 |
| 2004/0081717 | A1* | 4/2004 | Marazita | B29C 45/7653 425/150 |
| 2004/0088073 | A1* | 5/2004 | Yamazaki | B29C 45/76 700/200 |
| 2006/0247821 | A1* | 11/2006 | Nishizawa | B29C 45/76 700/200 |
| 2006/0253221 | A1* | 11/2006 | Katsuta | B29C 45/74 700/202 |
| 2007/0009627 | A1* | 1/2007 | Konishi | B29C 45/76 425/162 |
| 2008/0021678 | A1* | 1/2008 | Grimm | B29C 45/26 702/188 |
| 2008/0038393 | A1* | 2/2008 | Saito | B29C 45/766 425/135 |
| 2010/0332018 | A1* | 12/2010 | Chen | B29C 45/76 700/201 |
| 2013/0103184 | A1* | 4/2013 | Morikawa | B22D 17/32 700/197 |

FOREIGN PATENT DOCUMENTS

| | | |
|---|---|---|
| JP | 2001-088186 | 4/2001 |
| JP | 2002-245094 | 8/2002 |
| JP | 2004-155104 | 6/2004 |
| JP | 3781718 | 3/2006 |
| JP | 2006-289911 | 10/2006 |
| JP | 2010-089283 | 4/2010 |

OTHER PUBLICATIONS

English Language Abstract of JP 2004-155104 published on Jun. 3, 2004.
English Language Translation of JP 2004-155104 published on Jun. 3, 2004.
English Language Abstract of JP 2001-088186 published Apr. 3, 2001.
English Language Translation of JP 2001-088186 published Apr. 3, 2001.
English Language Abstract of JP 2006-289911 published Oct. 26, 2006.
English Language Translation of JP 2006-289911 published Oct. 26, 2006.
English Language Abstract of JP 2002-245094 published Aug. 30, 2002.
English Language Translation of JP 2002-245094 published Aug. 30, 2002.
English Language Abstract of JP 2010-089283 published Apr. 22, 2010.
English Language Translation of JP 2010-089283 published Apr. 22, 2010.
Chinese Office Action issued in CN 201180038524.4 on Aug. 22, 2013.
English Language Translation of Chinese Office Action issued in CN 201180038524.4 on Aug. 22, 2013.
English Language Abstract of CN 1654185 published Aug. 17, 2005.
English Language Translation of JP 3781718 published Mar. 17, 2006.
German Office Action issued in DE 11 2011 102 645.5 on Jul. 14, 2014 with English Language Translation.
English Language Abstract of DE 10 2006 017 499 published on Oct. 19, 2006.
Coca-Cola Freestyle. Wikipedia [online], Sep. 7, 2014.
International Preliminary Report on Patentability and Written Opinion issued in PCT/JP2011/067514 on Mar. 12, 2013.

* cited by examiner

CONTROL DEVICE FOR MOLDING MACHINE AND MANUFACTURING METHOD FOR MOLDED ARTICLE

CROSS REFERENCE TO RELATED APPLICATIONS

This application is a Continuation Application of PCT Application No. PCT/JP2011/067514, filed Jul. 29, 2011 and based upon and claiming the benefit of priority from prior Japanese Patent Application No. 2010-177850, filed Aug. 6, 2010, the entire contents of all of which are incorporated herein by reference.

BACKGROUND OF THE INVENTION

1. Field of the Invention

The present invention relates to a control device comprising a human machine interface unit used in a molding machine, such as an injection molding machine or die-cast molding machine, and a manufacturing method for molded articles manufactured by the molding machine.

2. Description of the Related Art

Molding machines using molds, such as injection molding machines, die-cast molding machines, etc., are configured to efficiently manufacture molded articles by repeating a series of cycles, including mold closing, injection, dwell, mold opening, etc., in a predetermined order, based on a sequential program stored in a control device. In the molding machine of this type, molding conditions are set for each mold used for a molded article. Before starting molding, therefore, operations are performed such that the molding conditions are retrieved from a storage device and input to the control device.

The molding machine is furnished with a human machine interface unit comprising a display section with a touchpanel such that the molding conditions can be retrieved and input by using the display section with the touchpanel. For example, the display section with the touchpanel is used to input various data on metering, injection, mold opening/closing, molded article take-out, etc., to a control section, and these data are displayed on the display section with the touchpanel.

In retrieving the molding conditions, operations are performed such that indices based on character information related to the molded articles and molds are listed on the display section with the touchpanel, a desired one of the indices is selected, and the molding conditions are called up.

According to Patent Document 1 (Jpn. Pat. Appln. KOKAI Publication No. 2001-88186), for example, character information representative of a plurality of kinds of mold data and the names of molded articles is listed on a display section with a touchpanel, and desired mold data and the like are selected from the character information so that the molding conditions, images of the molded articles, etc., can be simultaneously displayed. Alternatively, according to Patent Document 2 (Jpn. Pat. Appln. KOKAI Publication No. 2006-289911), indices based on character information representative of a plurality of types of molds and molded articles are listed on a display section with a touchpanel, and a desired one of these indices is selected so that a desired molded article or mold image and memo information can be simultaneously displayed.

PRIOR ART DOCUMENT

Patent Document

Patent Document 1: Jpn. Pat. Appln. KOKAI Publication No. 2001-88186

Patent Document 2: Jpn. Pat. Appln. KOKAI Publication No. 2006-289911

BRIEF SUMMARY OF THE INVENTION

Problem to be Solved by the Invention

In retrieving the molding conditions corresponding to the molds, as described above, it is conventionally necessary to call up the molding conditions corresponding to each molded article onto the screen of the display section with the touchpanel by selecting the desired molded article, molds, etc., from a large number of pieces of character information. Therefore, the retrieval takes a long time, and moreover, inexperienced operators may possibly perform erroneous retrieval.

Accordingly, an object of the present invention is to provide a control device for a molding machine, capable of efficiently, accurately retrieving desired molding conditions. Further, an object of the present invention is to provide a manufacturing method for manufacturing a molded article under the molding conditions obtained by the retrieval.

Means for Solving the Problem

A control device according to one embodiment comprises a human machine interface unit comprising a display section with a touchpanel, a first storage section stores molding conditions corresponding to molded articles of a plurality of types each affixed with identification information, a second storage section stores images of the molded articles representing shapes of the molded articles, wherein the human machine interface unit is configured to list an image group comprising a plurality of the images stored in the second storage section on the display section with the touchpanel. Further, the control device comprises a control section configured to call up the molding conditions corresponding to a preselected image from the first storage section and set the molding conditions for the molding machine and/or display the molding conditions on the display section with the touchpanel.

The images described herein are representations of the shapes of objects to be displayed, such as pictures of photographic subjects, CAD drawings, illustrations and drawings read by an image scanner, etc. In contrast, the character information is an array of characters and symbols based on character codes and cannot be understood without knowing the meaning of languages and symbols used.

In the embodiment described below, the human machine interface unit may be configured to display an image selection switch section 92 displayed on a character information screen 90. When the image selection switch section 92 is turned on, the display section is changed to an image list screen 100, and the image group is listed on the display section. At least one of the plurality of images that constitute the image group may be configured to be displayed while rotating or displayable in an enlarged or reduced scale.

Moreover, the human machine interface unit may be configured to display a sorting switch on the image list screen 100 and is configured to sort the listed image group when the sorting switch is turned on. Further, the images of the listed image group may be grouped together or sorted in the order of recent use. Furthermore, at least one image of the listed image group may be a three-dimensional image. If the image is a three-dimensional image, it can be displayed while rotating.

Further, the human machine interface unit (detail display step S9) may be configured to change the screen to a detail display screen 110 when one of the images of the listed image group is touched. The detail display screen 110 comprises an enlarged display section 111 configured to display an enlarged image of the touched image and a memo information display section 112 configured to call up memo information corresponding to the touched image from a third storage section and display the memo information.

In one embodiment of the control device, the detail display screen 110 comprises a call switch section 113 such that the molding conditions stored in the first storage section are called up from the first storage section, the screen is changed to a molding condition display screen 120, and the molding conditions are set in a main control section 40 and displayed on the molding condition display screen 120 when the call switch section 113 is turned on. Further, a plurality of index sections 91 formed of character information related to the molding conditions may be listed on a part of the character information screen 90. When any one of the index sections 91 is selected and touched, the detail display screen 110 corresponding to the touched index section 91 is displayed on the display section. In this case, an image list display step S6 is skipped, so that the image list screen 100 is not displayed.

Effect of the Invention

According to the present invention, the image group related to molded articles of a plurality of types, molds, etc., is listed on the display section with the touchpanel during retrieval of the molding conditions, so that an operator can select a desired image while viewing the image group. Based on the selected image, molding conditions corresponding to this image are called up, set in the control section, and displayed on the screen. Thus, retrieval of those molding conditions which cannot be easily discriminated by character information only can be efficiently performed, and occurrence of erroneous retrieval can be reduced.

Since the molding conditions can be set more quickly, moreover, manufacture of molded articles can be started in a shorter time. Thus, the availability of the molding machine can be increased. Since the operator can select the desired image while viewing the image group displayed on the image list screen, furthermore, occurrence of erroneous selection of the molding conditions can be reduced and molding of wasteful molded articles can be suppressed.

DETAILED DESCRIPTION OF THE INVENTION

One embodiment of the present invention will now be described with reference to FIGS. 1 to 8.

Figure 1:
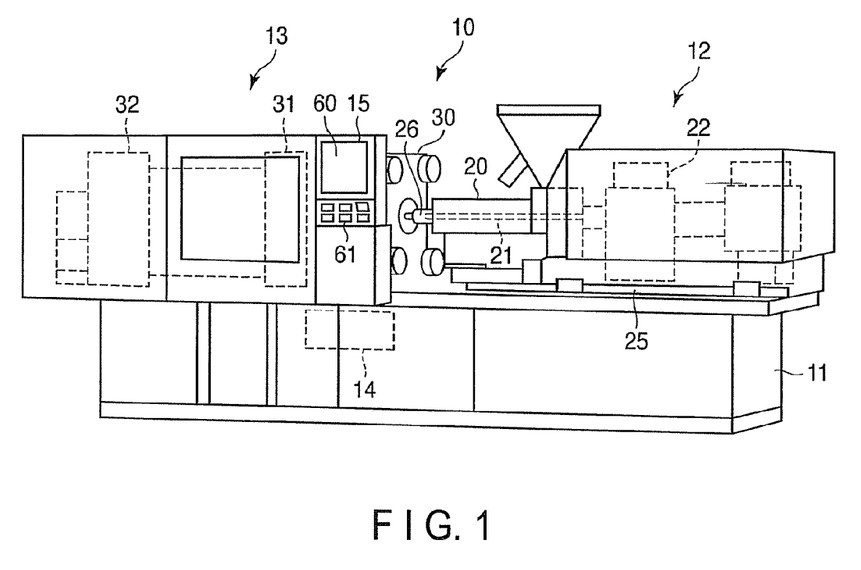
FIG. 1 is a perspective view showing one embodiment of a molding machine.

FIG. 1 shows an electric injection molding machine 10 as an example of a molding machine. The injection molding machine 10 will hereinafter be referred to simply as the molding machine 10. This molding machine 10 comprises a body 11 including a frame for use as a base, injection device 12 and mold clamping device 13 located on the body 11, control device 14 incorporated with a computer program for controlling molding operation, and the like, control panel 15 that functions as a human machine interface unit, etc.

An example of the injection device 12 comprises a barrel 20, screw 21 disposed in the barrel 20 for rotation and advance/retreat, screw drive mechanism 22 for driving the screw 21, heating device (not shown) for heating a material, etc. The injection device 12 can advance and retreat along rails 25 on the body 11. A nozzle 26 is disposed on the distal end of the barrel 20. The mold clamping device 13 is disposed in front of the nozzle 26.

The mold clamping device 13 comprises a fixed die plate 30, movable die plate 31, mold clamping mechanism 32, etc. A fixed mold (not shown) is mounted on the fixed die plate 30, while a movable mold (not shown) is mounted on the movable die plate 31. As the movable die plate 31 is driven by the mold clamping mechanism 32, the movable mold is opened or closed relative to the fixed mold. A cavity for the molded article is formed between the fixed mold and movable mold clamped by the mold clamping mechanism 32. The injection device 12 is sequentially controlled by the control device 14 so that the material melted in the barrel 20 can be injected through the nozzle 26 into the cavity of the molds.

Figure 2:
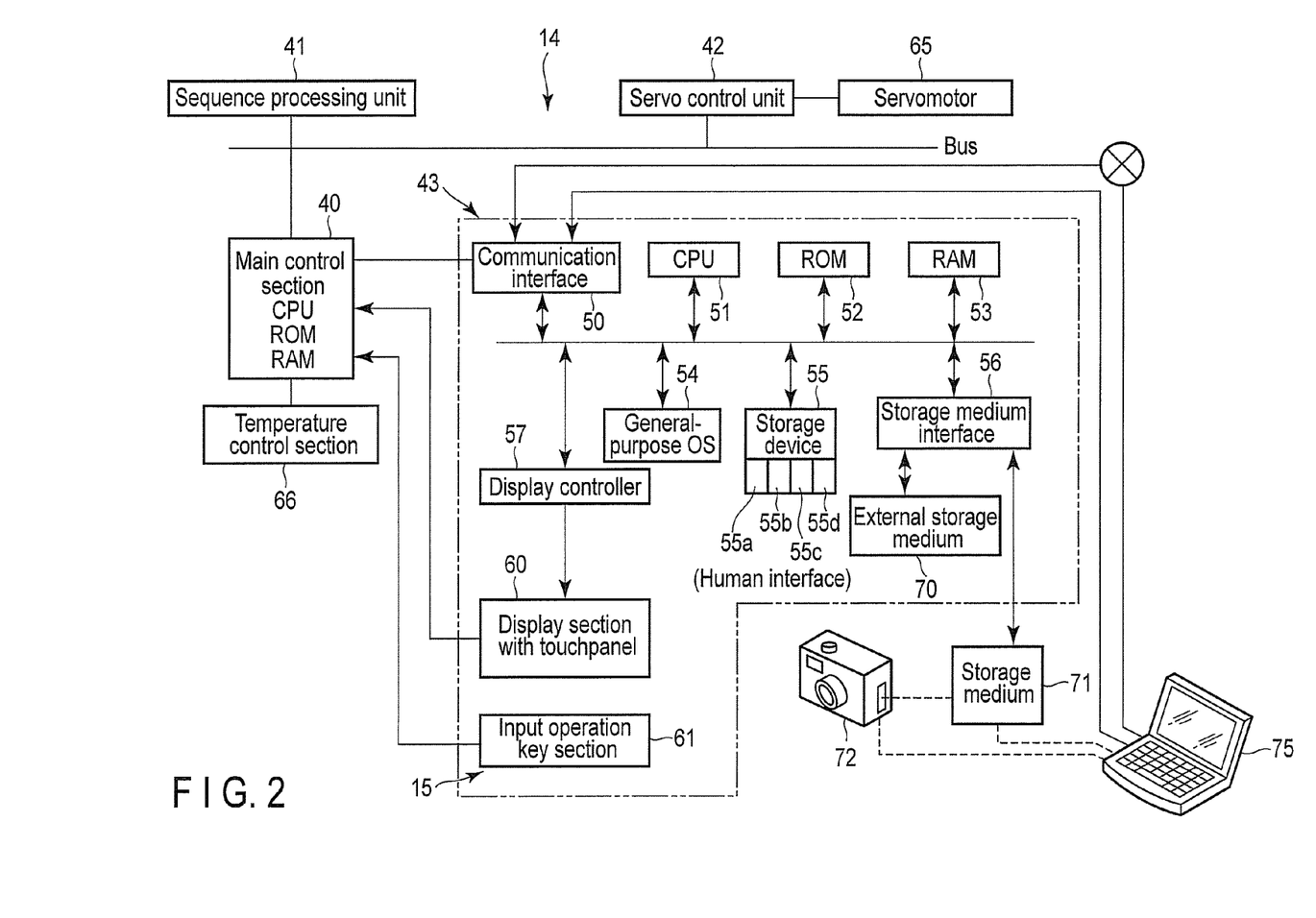
FIG. 2 is a block diagram of a control device for the molding machine shown in FIG. 1.

FIG. 2 shows a block diagram of the control device 14. This control device 14 comprises a main control section 40, a sequential processing unit 41, servo control unit 42, human machine interface unit 43, etc.

The human machine interface unit 43 comprises a communication interface section 50 connected to the main control section 40, central processing unit (CPU) 51 that controls operation read-only memory (ROM) 52 for use as a nonvolatile memory, random access memory (RAM) 53 that functions as a work memory, general-purpose operating system (OS) 54, storage device 55 that stores various data, storage medium interface section 56, display controller 57, display section 60 with a touchpanel, input operation key section 61, etc. In this specification, the display section 60 with the touchpanel may sometimes be referred to simply as the display section 60.

The display section 60 with the touchpanel and input operation key section 61 are arranged on the control panel 15 (shown in FIG. 1). Various switch sections, as well as a screen that functions as a display (display panel), are displayed on the display section 60 with the touchpanel such that a predetermined input operation can be achieved when a desired switch section is touched. On the other hand, mechanical switches, display lights, etc., to be operated in activating or stopping the molding machine 10 are arranged on the input operation key section 61 (shown in FIG. 1).

A ROM of the main control section 40 is incorporated with a sequential program for activating the molding machine 10 in a predetermined sequence. Based on this sequential program, signals for the injection device 12, the mold clamping device 13, a molded article take-out mechanism (not shown), etc., are output in a predetermined order so that molding cycles can be repeated. The servo control unit 42 has the function of controlling a servomotor 65 (only a part of which is shown in FIG. 2) of the injection device 12 and the like. A temperature control section 66 controls the temperature of the heating device.

The storage device 55 can transfer information with an external storage medium 70, such as a disk drive, through the storage medium interface section 56. A first storage section 55a of this storage device 55 is stored with data on molding conditions set for each of molded articles of various types, along with identification information affixed thereto.

Further, a plurality of image data recorded on, for example, a storage medium 71 are input to a second storage section 55b of the storage device 55 and stored together with identification information. A plurality of image data picked up by an image-pickup device 72, such as a digital camera, are recorded together with identification information on the storage medium 71. The image-pickup device 72 may be configured to be able to pick up three-dimensional pictures as well as two-dimensional pictures. The image data recorded on the storage medium 71 are input to the second storage section 55b of the storage device 55 through the storage medium interface section 56 and stored together with identification information corresponding to each molded article.

The image data stored in the storage medium 71 may be three-dimensional computer-aided design (CAD) data or two-dimensional CAD data created by an information processing apparatus, such as a personal computer 75 (shown in FIG. 2), as well as photographic images. Further, the data (for example, picture data or CAD data) stored in the second storage section 55b of the storage device 55 may be stored into the second storage section 55b of the storage device 55 by some other information transmission path, as well as being stored from the storage medium 71 into the second storage section 55b of the storage device 55 through the storage medium interface section 56. For example, the data may be stored from the personal computer 75 into the second storage section 55b of the storage device 55 through the storage medium 71 and storage medium interface section 56. Alternatively, the data may be stored from the personal computer 75 into the second storage section 55b of the storage device 55 through the communication interface section 50 and a communication path, such as telecommunication, optical communication, radio, Internet, landline, mobile phone line, personal handyphone system (PHS), satellite circuit, etc.

A third storage section 55c of the storage device 55 is stored with various memo information and historical information set for each molded article and affixed with identification information. In short, the memo information described herein comprises data provided as references for molding molded articles, for example, a title, product code, mold code, mold number, material code, date of storage, and product features, which are displayed in a memo column 110a of a detail display screen 110 of FIG. 7, or instructions, notes, remarks, etc., which are affixed to each molded article. The historical information is displayed in a history column 110b of FIG. 7. The memo information and historical information are represented by characters or character information (character data), such as signs, symbols, etc.

Further, information as references for molding, such as a customer name, customer management code, customer management number, etc. (not shown in FIG. 7), may be stored as, for example, memo information in the third storage section 55c of the storage device 55 and displayed in the memo column 110a. The storage device 55 may also be stored with production management data, such as production operating conditions, production history, error history, etc., affixed with identification information. The error history is an error history of the entire molding system that comprises errors of peripheral devices of the molding machine, such as a take-out machine, take-out robot, spraying machine, spraying robot, etc., as well as errors of the molding machine. The production history and error history may be handled as the memo information. Further, the production operating conditions, production history, and error history may be stored in, for example, a fourth storage section 55d of the storage device 55. Other storage media (for example, hard disk, flexible disk, nonvolatile semiconductor memory, etc.) than the storage device 55 may be used for the first, second, third, and fourth storage sections.

Figure 3:
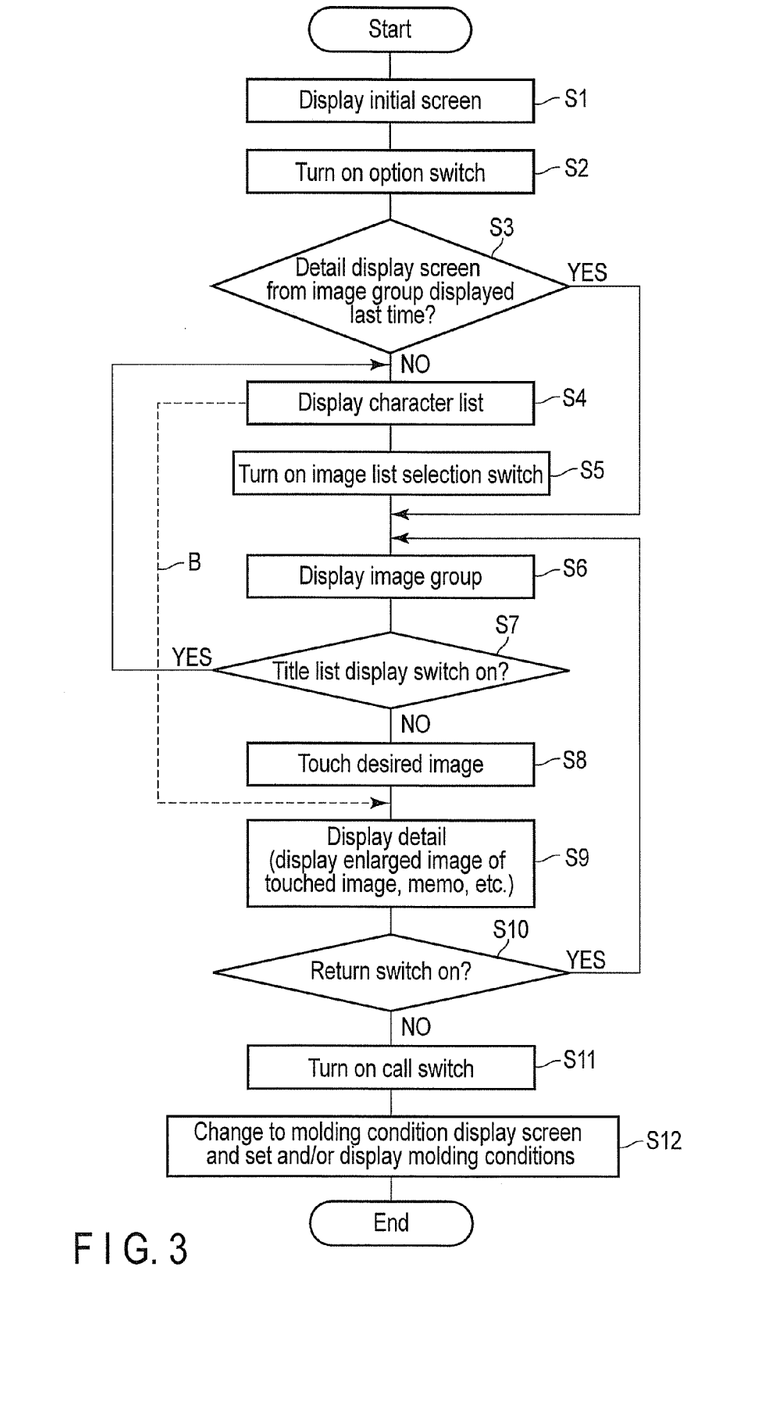
FIG. 3 is flowchart showing an example of a flow of processing performed by the control device shown in FIG. 2.

FIG. 3 shows an outline of manipulation performed using the control panel 15 in an input operation for the molding conditions performed before molding. FIGS. 4 to 8 show examples of screens displayed on the display section 60 with the touchpanel during the input operation.

The flowchart of FIG. 3 comprises an initial screen display step S1, option selection step S2, operation check step S3, character information display step S4, image list selection step S5, image list display step S6, title list selection step S7, image selection step S8, detail display step S9, return operation step S10, call operation step S11, and molding condition display step S12, which are shown in a descending order from top to bottom. The following is a description of these steps S1 to S12.

Figure 4:
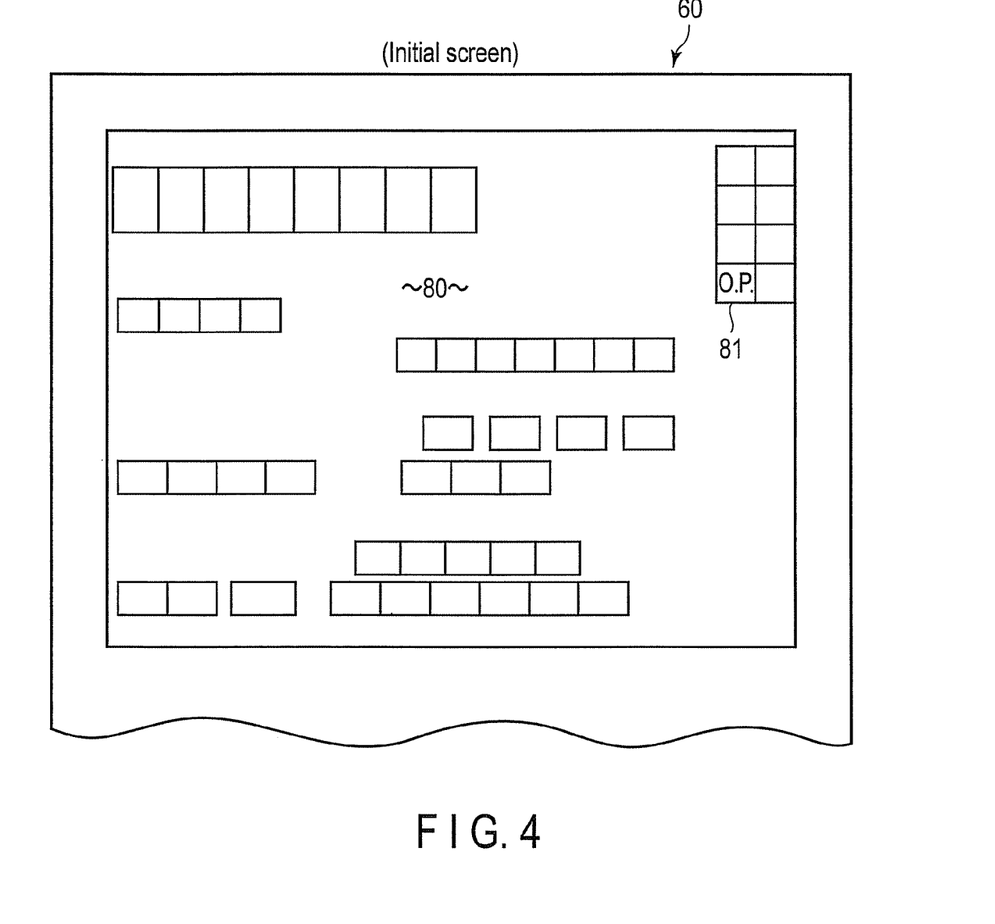
FIG. 4 is a front view showing an example of an initial screen of a display section of the molding machine shown in FIG. 1.

If the power of the molding machine 10 is turned on, the program proceeds to the initial screen display step S1, whereupon an initial screen (batch setup screen) 80 schematically shown in FIG. 4 is displayed on the display section 60 with the touchpanel. An option selection switch section (option selection icon) 81 is displayed on a part of the initial screen 80.

Then, if the option selection switch section 81 is turned on in the option selection step S2, the program proceeds to the operation check step S3. The storage device 55 is configured to be able to remember whether the operation for displaying the detail display screen 110 (shown in FIG. 7) described later is achieved by selecting a desired one of images 101 on an image list screen 100, as in the image selection step S8, or whether it is achieved by touching a desired one of index sections 91 of a character information screen 90, as indicated by broken line B in FIG. 3.

The memory content is called up in the operation check step S3. In the case of a first operation or if the last operation for displaying the detail display screen 110 is achieved by touching the desired index section 91 of the character information screen 90, as indicated by broken line B in FIG. 3, the program proceeds to the character information display step S4. If the last operation for displaying the detail display screen 110 is achieved by selecting the desired one of the images 101 on the image list screen 100, as in the image selection step S8 described later, the program bypasses the character information display step S4 and proceeds to the image list display step S6.

By providing this operation check step S3, the operation of either the character information display step S4 or the image list display step S6 can be omitted in displaying the detail display screen 110 (shown in FIG. 7) in the detail display step S9 described later, so that the molding conditions can be efficiently retrieved in a shorter time.

Figure 5:
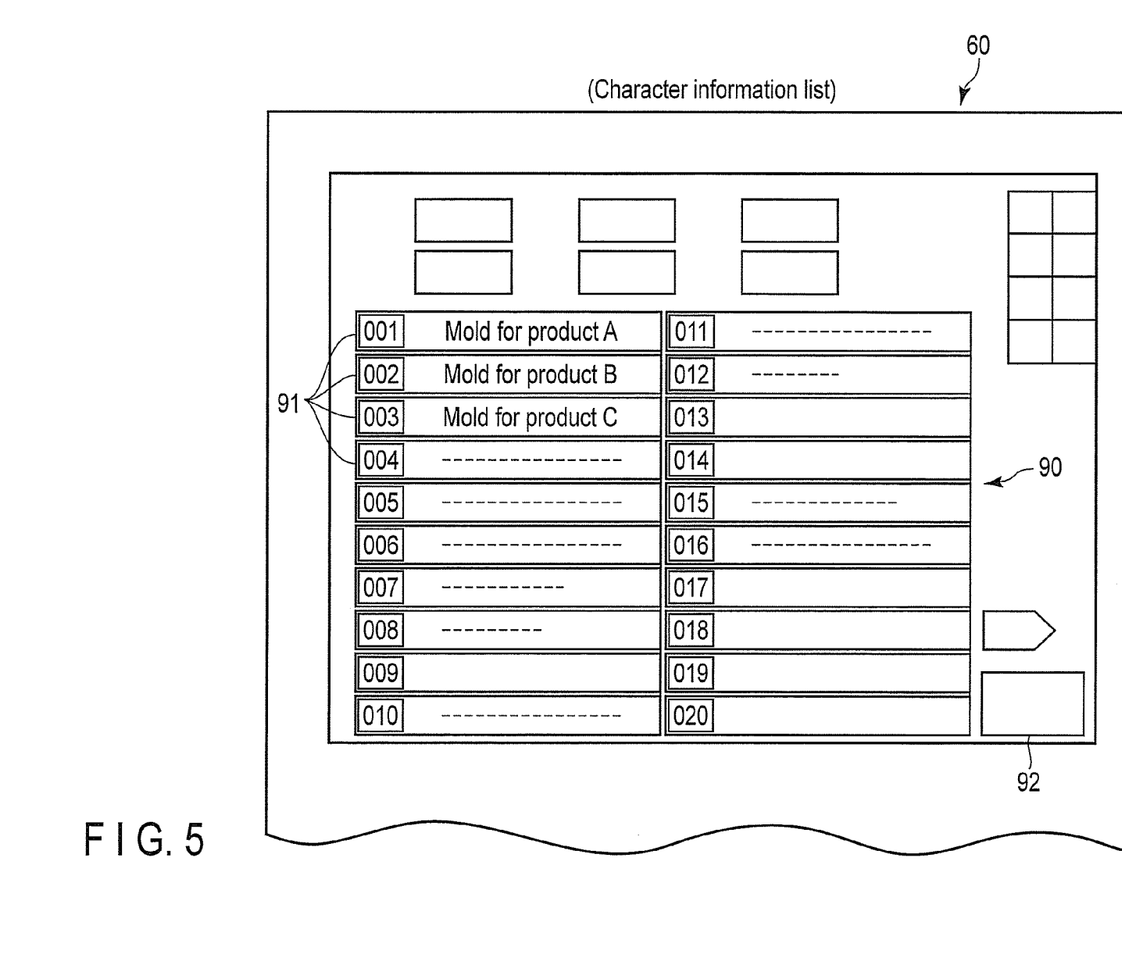
FIG. 5 is a front view showing an example of a character information screen of the display section.

In the character information display step S4, as shown in FIG. 5 by way of example, the character information screen 90 is displayed on the display section 60. Molds corresponding to the molding conditions, mold numbers corresponding to the molding conditions, or numbers, symbols, etc., corresponding to the molded articles are listed in the index sections 91 collectively displayed on the character information screen 90. Further, an image selection switch section 92 is displayed on a part of the character information screen 90.

Any operator who is experienced in the operation of the molding machine 10 can estimate which molding condition data for molding the molded article the character information displayed on the index section 91 represents by looking at the index section 91 of the character information screen 90. If the desired index section 91 is touched, therefore, the program bypasses the image list display step S6 and proceeds to the detail display step S9, as indicated by broken line B in FIG. 3, so that the screen can be changed to the detail display screen 110 (shown in FIG. 7).

However, some operators who are inexperienced in the operation of the molding machine 10 or those operators who, though experienced in the operation, cannot easily understand the character information on the character information screen 90, because they usually use a language other than that in which the character information screen 90 is displayed, cannot judge the content displayed on the index section 91. Thereupon, if the image selection switch section 92 is turned on in the image list selection step S5, the program proceeds to the image list display step S6.

Figure 6:
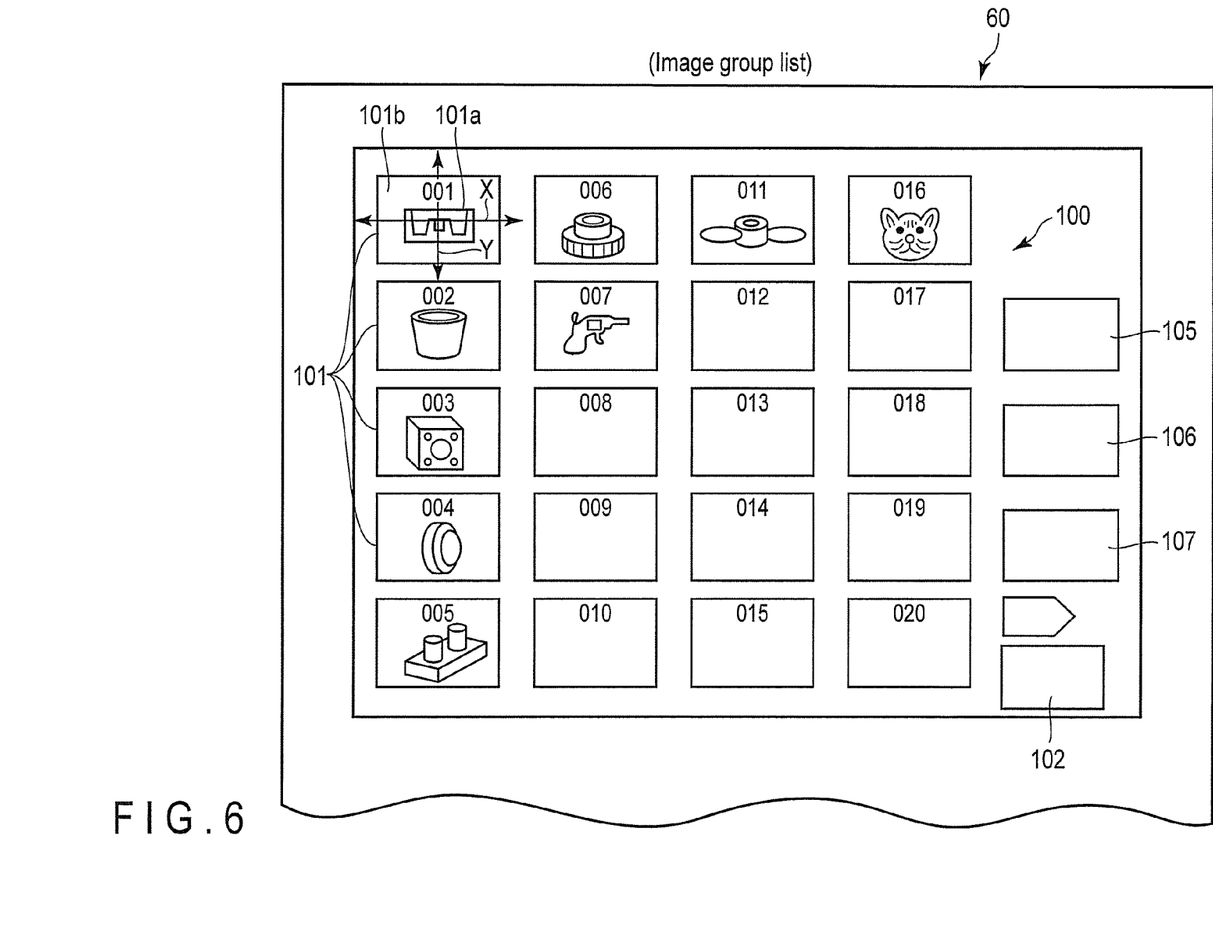
FIG. 6 is a front view showing an example of an image list screen of the display section.

In the image list display step S6, the image list screen 100, an example of which is shown in FIG. 6, is displayed on the display section 60. An image group consisting of the plurality of images 101 read from the second storage section 55b of the storage device 55 is listed together with identification information in the image list screen 100. A title list display switch 102 is also displayed on a part of the screen 100. A customer-oriented sorting switch 105, material-oriented sorting switch 106, and most-recently-used sorting switch 107 are displayed on the image list screen 100.

The images 101 displayed on the image list screen 100 are two- or three-dimensional pictures picked up by the image-pickup device 72 (shown in FIG. 2), such as a digital camera, or two- or three-dimensional CAD images created by the personal computer 75 or the like. These image data are stored together with identification information corresponding to each molding condition in the second storage section 55b of the storage device 55. If the title list display switch 102 of the image list screen 100 is turned on, the program proceeds to the title list selection step S7, whereupon the character information screen 90 shown in FIG. 5 is restored.

Further, let it be assumed that, for example, the most-recently-used sorting switch 107 shown in FIG. 6 is touched (or turned on). Thereupon, the control device 14 compares, for example, data indicative of the production operating conditions, out of the production management data on the individual molded articles stored in the storage device 55, and sorts the plurality of images 101 displayed on the image list screen 100, in the order of recent use. The images may be arranged vertically or horizontally, and in short, should only be sorted in order. If the images are thus sorted, recently used molding condition data can be mainly retrieved even if a large number of molding condition data are stored in the storage device 55. Thus, the molding conditions can be retrieved more quickly, and the operability of the control device is improved.

Furthermore, let it be assumed that, for example, the material-oriented sorting switch 106 shown in FIG. 6 is touched (or turned on). Thereupon, the control device 14 compares, for example, the material codes of the molded articles stored in the third storage section 55c of the storage device 55. Then, it classifies the molded articles by the material codes and sorts them, for example, in the order of identification of the material codes. If the material codes are the same molding condition data, the molded articles are arranged, for example, in the ascending order of their mold numbers. Then, the plurality of images 101 displayed on the image list screen 100 are sorted by image groups according to the material codes. When this is done, the respective frames of the images 101 displayed on the image list screen 100 may be color-coded by the material codes as they are displayed. This color-coded display enables more accurate retrieval in a shorter time. Since the plurality of images 101 can be grouped together, moreover, the retrieval can be achieved more efficiently, so that the operability of the control device is improved.

Further, let it be assumed that, for example, the customer-oriented sorting switch 105 shown in FIG. 6 is touched (or turned on). Thereupon, the control device 14 compares, for example, the customer management codes or customer management numbers of the molded articles stored in the third storage section 55c of the storage device 55. Then, it classifies the molded articles by the customer management codes or customer management numbers, sorts them, for example, by customer-oriented image groups, and color-codes them to be displayed by the customer-oriented image groups. If there are a plurality of molding condition data for one customer, the molded articles are arranged, for example, in the ascending order of their mold numbers.

Only a single sorting switch may be displayed on the image list screen 100. In this case, the switch may be configured so that another small window is displayed on the screen 100 when it is touched (or turned on) and a plurality of sorting switches are displayed by application in the window. Further, the control device 14 may have such a function that a user can set sorting by application so that sorting corresponding to the user's application can be achieved. Thus, the sorting can be set for each user, so that more accurate retrieval can be achieved in a shorter time, and the operability of the control device can be improved.

Moreover, such a configuration may be adopted, for example, that a certain image 101 of the image group displayed on the image list screen 100 or all the images 101 are displayed in an enlarged or reduced scale when the frame of the certain image 101 or a non-image part 101b within the frame of the image 101 is specifically manipulated (for example, touched and dragged by a finger). Thus, the image list screen 100 is configured so that an operator can enjoy easily visible images to achieve accurate retrieval in a shorter time.

Figure 7:
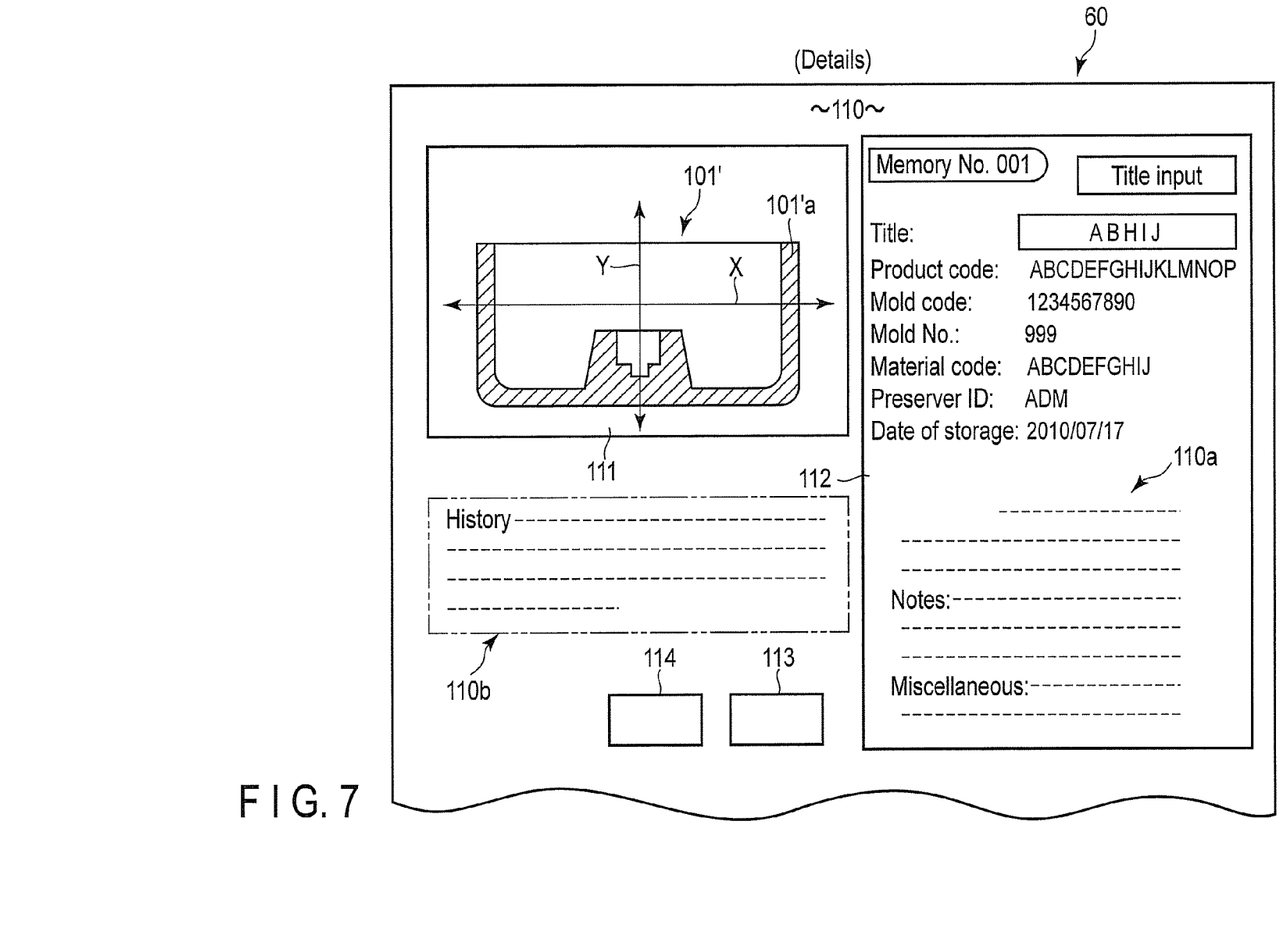
FIG. 7 is a front view showing an example of a detail display screen.

Furthermore, three-dimensional pictures or three-dimensional CAD image may sometimes be used. If an image main body portion 101a of the three-dimensional image 101 displayed on the image list screen 100 is specifically manipulated, in this case, the control device 14 rotates the manipulated image main body portion 101a of the image 101 in a direction responsive to the manipulation. If the image main body portion 101a is touched and dragged horizontally (in the direction of an abscissa X in FIG. 6), for example, the image main body portion 101a apparently rotates about an ordinate Y at a predetermined speed. Alternatively, if the image main body portion 101a is touched and dragged vertically (in the direction of the ordinate Y in FIG. 6), the image main body portion 101a apparently rotates about the abscissa X at a predetermined speed. If there is a two-dimensionally displayed image that cannot be easily discriminated, therefore, the operator can determine whether or not it is an image to be retrieved by looking at it three-dimensionally. Thus, the image can be more accurately retrieved in a shorter time. The enlarged- or reduced-scale display and rotational display of the three-dimensional image described above can also be adopted in the case of the detail display screen 110 to be described below.

In the image selection step S8, only a desired one of the images 101 is selected from the image group displayed on the image list screen 100 (FIG. 6) and touched. Thereupon, the program proceeds to the detail display step S9, in which the screen is changed to the detail display screen 110 shown in FIG. 7.

The detail display screen 110 comprises an enlarged display section 111 and memo information display section 112. An enlarged image 101' of the selected (or touched) image 101 is displayed on the enlarged display section 111. Further, memo information related to the selected image 101 is read from the third storage section 55c of the storage device 55 and displayed on the memo information display section 112. A call switch section 113 and return switch section 114 are displayed on a part of the detail display screen 110.

The enlarged image 101' may sometimes be a three-dimensional picture or three-dimensional CAD image. If an image main body portion 101'a of the three-dimensional enlarged image 101' displayed on the detail display screen 110 is specifically manipulated, in this case, the control device 14 rotates the manipulated image main body portion 101'a of the enlarged image 101' in a direction responsive to the manipulation. If the image main body portion 101'a is touched and dragged horizontally (in the direction of the abscissa X in FIG. 7), for example, the image main body portion 101'a apparently rotates about the ordinate Y at a predetermined speed. Alternatively, if the image main body portion 101'a is touched and dragged vertically (in the direction of the ordinate Y in FIG. 7), the image main body portion 101'a apparently rotates about the abscissa X at a predetermined speed. Thus, the operator can more accurately recognize the entire enlarged image 101'.

If the content displayed on the detail display screen 110 is not that desired, the return switch section 114 is turned (return operation step S10). Thereupon, the screen returns to the image list screen 100 shown in FIG. 6.

The content displayed on the detail display screen 110 (FIG. 7) is ascertained. If it is determined that the content is that desired, the call switch section 113 is turned on (call operation step S11). When the call switch section 113 is turned on, the program proceeds to the molding condition display step S12.

Figure 8:
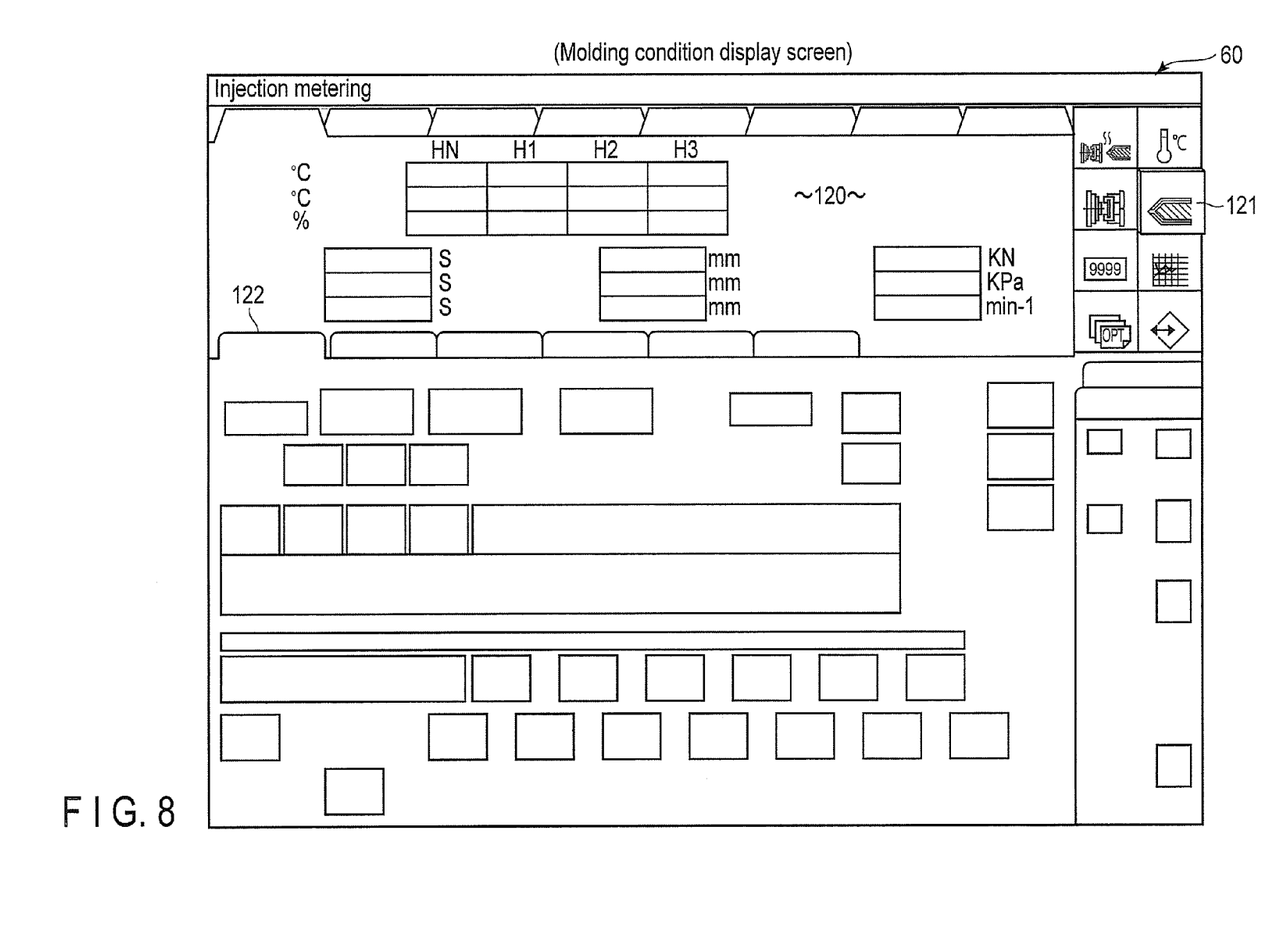
FIG. 8 is a front view showing an example of a molding condition display screen of the display section.

In the molding condition display step S12, the molding conditions having been stored in the first storage section 55a of the storage device 55 are called up based on the identification information. Various data on the called molding conditions are stored into, for example, the RAM 53 and a RAM of the main control section 40. Thereupon, a molding condition display screen 120 shown in FIG. 8 is displayed on the display section 60, and the called molding conditions are set in the main control section 40. On the molding condition display screen 120, desired display items can be selected and displayed by manipulating an item selection icon 121, detail display tab 122, etc.

The molding condition display screen 120 can be used to check the molding conditions or re-input the data on the molding conditions. The various input data are stored again in, for example, the RAM 53, and moreover, stored into the RAM of the main control section 40. In this way, the molding conditions are set again in the main control section 40. Thus, the molding machine 10 can perform molding under the molding conditions displayed on the molding condition display screen 120.

When the molding by the molding machine 10 is started after the input operation is finished, a series of molding cycles, including mold closing, injection, dwell, metering, mold opening, etc., is repeated in a predetermined order, based on the sequential program stored in the main control section 40 of the control device 14 and the data on the molding conditions, and a plurality of molded articles are sequentially molded.

According to the present embodiment, as described above, the image list screen 100 corresponding to the molded article can be displayed on the display section 60 with the touchpanel during the retrieval of the molding conditions and input operation performed before the molding. Accordingly, the operator can change the screen to the detail display screen 110 by selecting the desired image 101 from the image group displayed on the image list screen 100, obtain further detailed information according to the enlarged display section 111 and memo information display section 112, and determine whether or not the displayed content is related to the desired molded article. In this way, the molding condition display screen 120 corresponding to the desired molded article can be called up without error, and molding conditions corresponding to the called desired molded article can be set in the molding machine (control section of the molding machine).

Thus, even those operators who are inexperienced in the operation of the molding machine 10 or operators who cannot understand written languages displayed on the display section 60 with the touchpanel (for example, operators who cannot understand written languages displayable on the display section 60 with the touchpanel, since they use a language other than the written languages displayable on the display section 60 with the touchpanel) can select molding condition data of the molded article to be selected at once by visually observing the image list screen 100. Therefore, a list of molding conditions can be made easily visible using an image list, and moreover, the molding conditions corresponding to the molded articles can be set more correctly than in the conventional case, and the retrieval of the molding conditions can be achieved more quickly. In contrast, those operators who are experienced in the operation of the molding machine 10 can immediately call up the desired detail display screen 110 using the index sections 91 of the character information screen 90. Thus, the display section can be properly used according to the skill of the operator.

According to the embodiment of the present invention, therefore, the operability can be improved for all persons who manipulate the molding machine 10, including those operators who are inexperienced in the operation of the molding machine 10, operators who cannot understand written languages displayable on the display section 60 with the touchpanel, operators and managers who are experienced in the operation of the molding machine 10, etc.

In the above-described embodiment of the present invention, only a desired one of the images 101 is selected from the image group displayed on the image list screen 100 and touched in the image selection step S8, whereupon the program proceeds to the detail display step S9. Then, the molding conditions and the like are set in the molding condition display step S12 that follows the call operation step S11. However, the present invention is not limited to this. Such a configuration may be adopted, for example, that the program advances directly to the molding condition display step S12 without proceeding to the detail display step S9 so that the molding conditions are set and the molding conditions and the like are displayed when only one desired image 101 is selected from the image group displayed on the image list screen 100 in the image selection step S8 and the image 101 is specifically operated (for example, consecutively touched twice in a fixed period of time). In this case, desired molding conditions can be set and displayed by only selecting the desired image 101 from the image group displayed on the image list screen 100. Thus, time for the check of the molding conditions and the like using the detail display screen 110 can be reduced, the retrieval can be achieved more quickly, and the molding conditions can be set in a shorter time.

In the above-described embodiment of the present invention, moreover, although three-dimensional images (stereo images) are displayed if the images 101 displayed on the image list screen 100 or detail display screen 110 are three-dimensional images, the present invention is not limited to this. If the images 101 are three-dimensional images, for example, the images 101 may be displayed as pop-up images on the screen. In this case, a vision sensor is attached to the control panel 15, and manipulation of the three-dimensional images popping out of the screen is detected by the vision sensor and transmitted to the control device 14. Thus, the same operation can be performed as in the case where the images are displayed on the screen.

It is to be understood, in carrying out the present invention, that the specific forms of the screens displayed on the display section with the touchpanel, including the character information screen, image list screen, detail display screen, and molding condition display screen, may be variously modified as required. Further, the present invention is equally applicable to molding machines that use molds, such as die-cast molding machines, glass molding machines, transfer molding machines, extrusion molding machines, blow molding machines, etc., as well as injection molding machines.

EXPLANATION OF REFERENCE NUMBERS

10: Molding machine
14: Control device
43: Human machine interface unit
55: Storage device (first to fourth storage sections)
60: Display section with touchpanel
90: Character information screen
92: Image selection switch section
100: Image list screen
101: Image
110: Detail display screen
111: Enlarged display section
112: Memo information display section
120: Molding condition display screen

What is claimed is:
1. A control device for a molding machine, comprising:
   a human machine interface unit comprising a display section with a touchpanel;
   a first storage section storing molding conditions corresponding to molded articles of a plurality of types each affixed with identification information;
   a second storage section storing images of the molded articles representing shapes of the molded articles;
   wherein the human machine interface unit is configured to list an image group comprising a plurality of the images stored in the second storage section on the display section with the touchpanel and receive a selection of an image from the touchpanel; and
   a control section configured to call up the molding conditions corresponding to the selected image from the first storage section and set the molding conditions for the molding machine.

2. The control device for a molding machine according to claim 1, wherein the human machine interface unit is configured to display an image selection switch section on the display section with the touchpanel such that the image group is listed on the display section with the touchpanel when the image selection switch section is turned on.

3. The control device for a molding machine according to claim 1, wherein the human machine interface unit is configured to display a sorting switch on the display section with the touchpanel and is configured to sort the listed image group when the sorting switch is turned on.

4. The control device for a molding machine according to claim 3, wherein the images of the listed image group are grouped together.

5. The control device for a molding machine according to claim 3, wherein the images of the listed image group are sorted in the order of recent use.

6. The control device for a molding machine according to claim 1, wherein at least one image of the listed image group is a three-dimensional image.

7. The control device for a molding machine according to claim 6, wherein the three-dimensional image is configured to be displayed while rotating.

8. The control device for a molding machine according to claim 1, wherein the image is displayable in an enlarged or reduced scale.

9. The control device for a molding machine according to claim 1, further comprising:
   a third storage section storing memo information related to the molded articles each affixed with identification information, wherein
   the human machine interface unit is configured to change the screen to a detail display screen when one of the images of the listed image group is touched, the detail display screen comprising an enlarged display section configured to display an enlarged image of the touched image and a memo information display section configured to call up memo information corresponding to the touched image from the third storage section and display the memo information.

10. The control device for a molding machine according to claim 9, wherein the detail display screen comprises a call switch section such that the molding conditions stored in the first storage section are called up from the first storage section and the screen is changed to a molding condition display screen when the call switch section is turned on.

11. The control device for a molding machine according to claim 1, wherein the human machine interface unit is configured to display the molding conditions on the display section with the touchpanel.

12. A control device for a molding machine, comprising:
   a human machine interface unit comprising a display section with a touchpanel;
   a first storage section storing molding conditions corresponding to molded articles of a plurality of types each affixed with identification information;
   a second storage section storing images of the molded articles representing shapes of the molded articles;

wherein the human machine interface unit is configured to list an image group comprising a plurality of the images stored in the second storage section on the display section with the touchpanel and receive a selection of an image from the touchpanel; and wherein the human machine interface unit is configured to call up the molding conditions corresponding to the selected image from the first storage section and display the molding conditions on the display section with the touchpanel.

* * * * *